June 26, 1962 W. L. ELLIOTT 3,040,409
CUP TURNING MACHINE
Filed June 5, 1957 7 Sheets-Sheet 1

INVENTOR.
Walter L. Elliott
BY Webb, Mackey & Burden
HIS ATTORNEYS

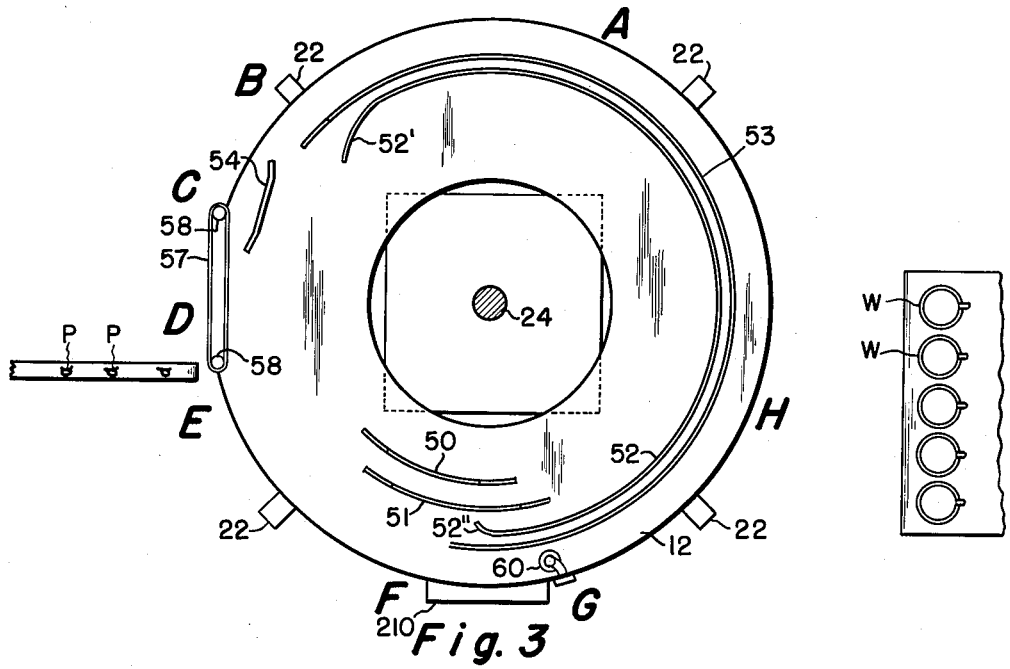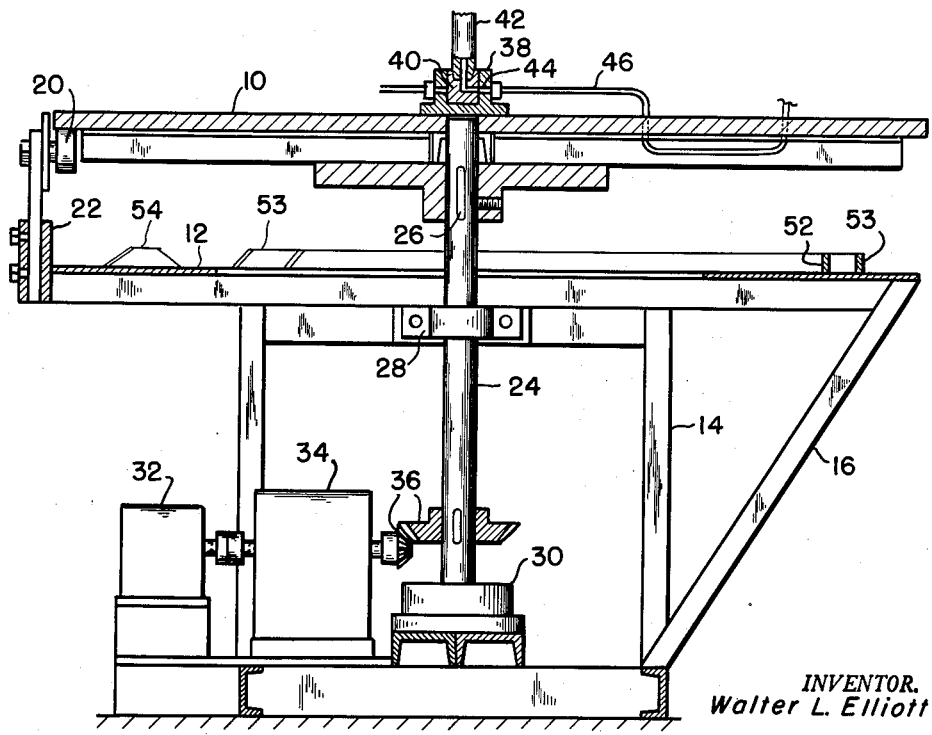

INVENTOR.
Walter L. Elliott

June 26, 1962  W. L. ELLIOTT  3,040,409
CUP TURNING MACHINE

Filed June 5, 1957  7 Sheets-Sheet 4

INVENTOR.
Walter L. Elliott
BY Webb, Mackey & Burden
HIS ATTORNEYS

June 26, 1962 W. L. ELLIOTT 3,040,409
CUP TURNING MACHINE
Filed June 5, 1957 7 Sheets-Sheet 5
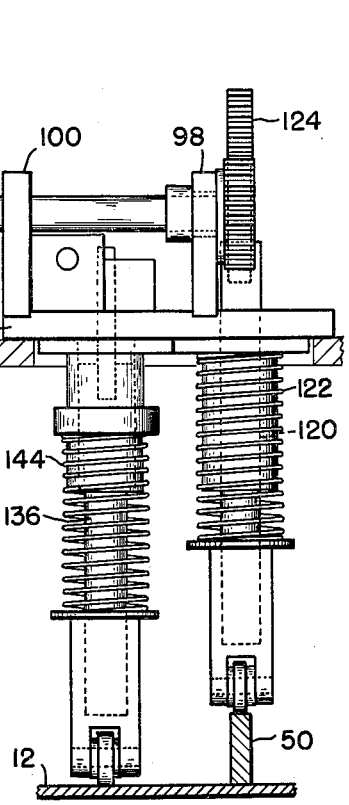
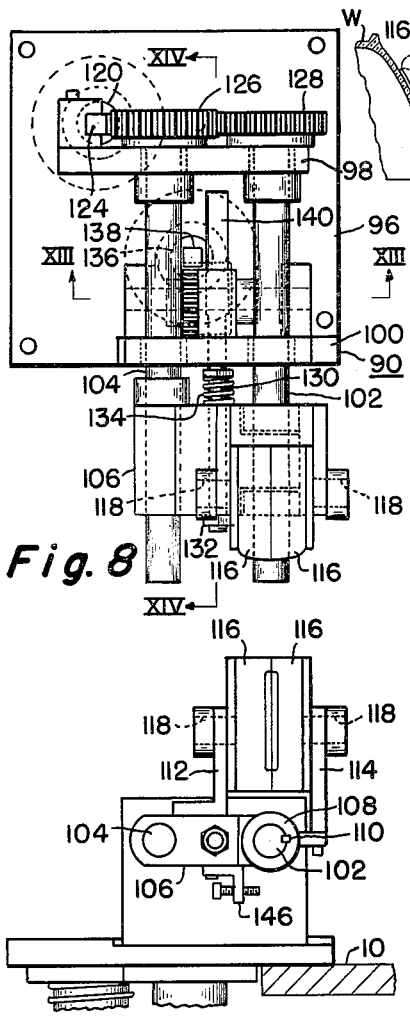
Fig. 12
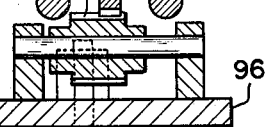
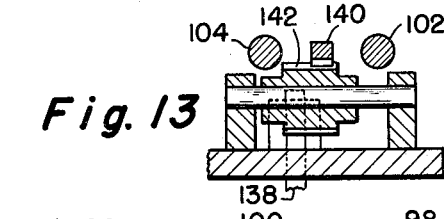
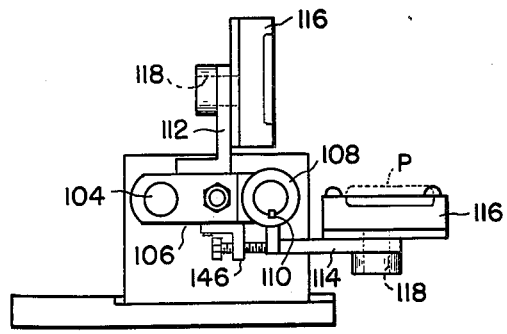
INVENTOR.
Walter L. Elliott
BY Webb, Mackey & Burden
HIS ATTORNEYS June 26, 1962 W. L. ELLIOTT 3,040,409
CUP TURNING MACHINE
Filed June 5, 1957 7 Sheets-Sheet 6
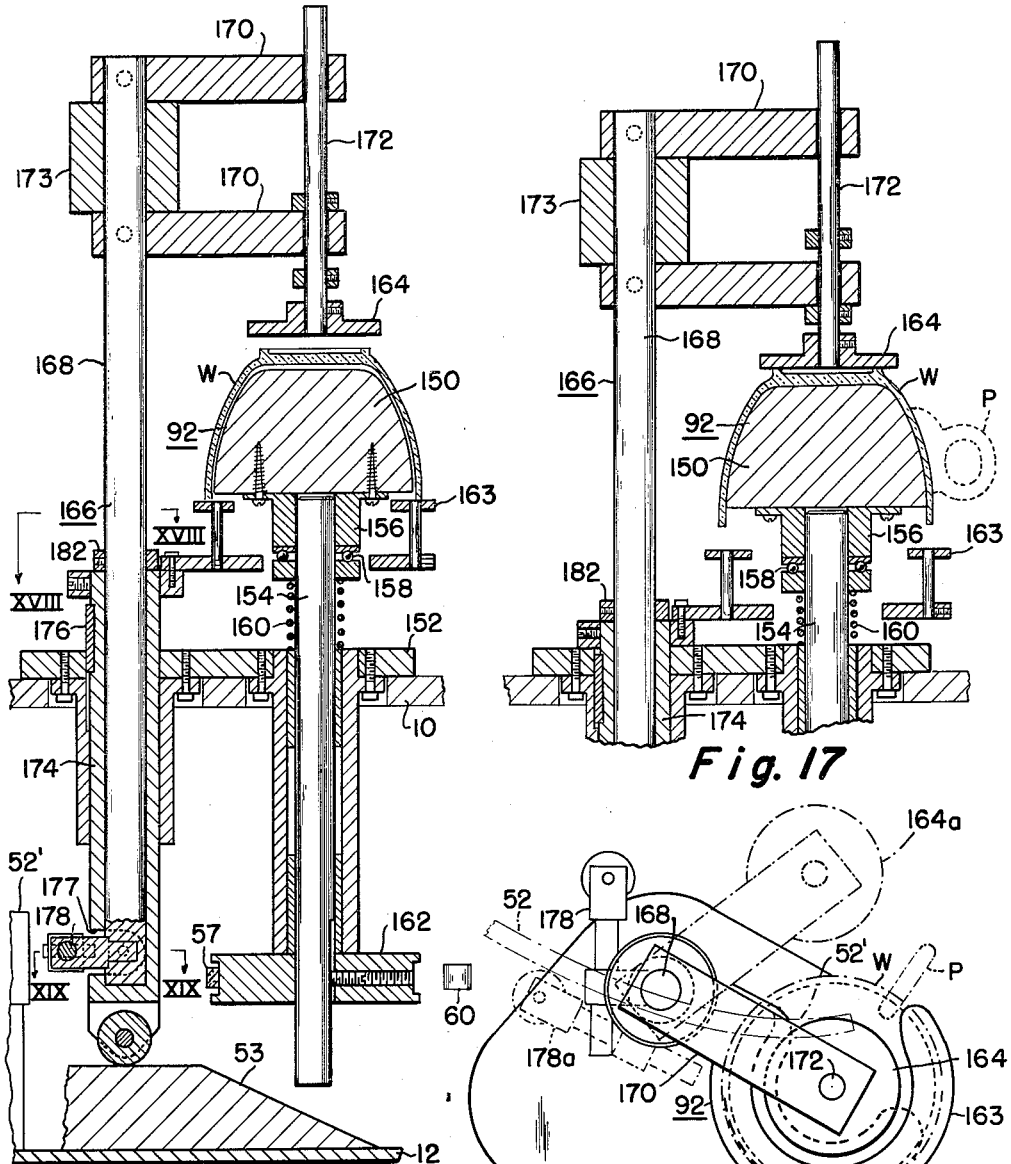
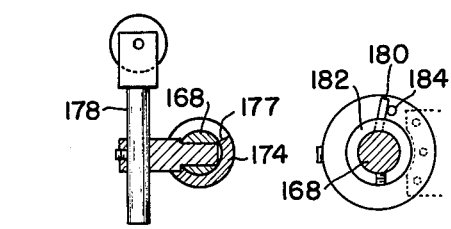
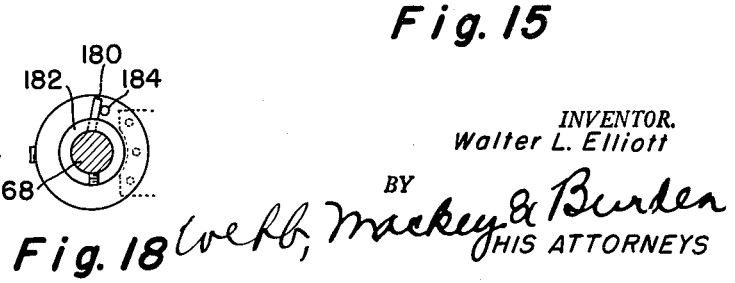
INVENTOR.
Walter L. Elliott
BY Webb, Mackey & Burden
HIS ATTORNEYS

United States Patent Office 3,040,409
Patented June 26, 1962

3,040,409
CUP TURNING MACHINE
Walter L. Elliott, East Liverpool, Ohio, assignor to The Taylor, Smith & Taylor Company, East Liverpool, Ohio, a corporation of Ohio
Filed June 5, 1957, Ser. No. 663,626
7 Claims. (Cl. 25—22)

This invention relates to a machine for supporting, turning and cutting the lips of hollow earthenware and china articles, particularly cups, prior to sticking handles to such articles. Handling, as it is termed, is usually the final operation done with the shaped cup material still semi-plastic or green and the union of the handle with the green cup body makes it ready for drying and firing.

Hand work persists in a large number of operations in the manufacture of cups as it is presently practiced, largely because of the difficulty of developing a machine to automatically perform the many different tool manipulations required in operating upon the soft green clay material and because of the failure of machines generally to be able to mechanically duplicate the constructive skill in manipulating the cup cutting tools and supporting the trimmed portions of the cup as done by manual operations.

This invention remedies the above difficulties of operation in several ways. First, it provides an effective cup supporting fixture comprising an accurate cup locator and a cup hold-down for securing the cup squarely and firmly to a coaxially rotatable support without defacing the soft material nor permitting slippage or tearing or spoilage of the surface. With this invention, I am further able to provide cooperating turning and sponge belt fixtures which together with the cup supporting fixture are mounted in common to a turntable structure and which cut or trim the lip of the rotating cup to remove sharp edges and thereafter automatically sponge that lip smoothly.

The novel structure provided according to the preceding paragraph has the desirable operating feature that the turntable structure is in continuous motion, turning fairly rapidly and the cups being produced under a sustained rate maintainable approximately at 110 dozen cups per hour. That rate is readily apparent as an increase several-fold over the production rates commonly yielded in production lines.

Consistent with the feature of maintaining uninterrupted table motion and a continuous flow of cups, I provide drive belting and a bumper having fixed positions in a novel arrangement about the turntable of my machine so as to be engaged at proper times while the table is continuously revolving, thereby setting the rotatable cup support in motion to turn the cup for one period of rotation and later for a fractional part of a turn in trimming and then rotating it out of the handle holder dies respectively. The drive belting and the similarly arranged length of sponge belt referred to for smoothing the lip of the cup, have flexible flights trained to run as encroaching chords on the arc of revolution of the table. When engaged each flight necessarily yields laterally in a manner to wrap against the rotatable cup support or the supported cup as they revolve by. The actual arc of belt wrap is slight, amounting merely to a few degrees on the circumference of the support or cup, but nevertheless that wrap is sufficient to develop the necessary belt friction which is steadily continued with and until the fixture gradually revolves out of the displacing portion of is rack.

This invention is primarily adapted for cup manufacturing but it will be understood that the operating principles apply with equal advantage to the making of various chinaware and earthenware articles of a hollow construction requiring the attachment of appendages such as handles, spouts, or other projections in their manufacture.

Further features, objects, and advantages will either be specifically pointed out or become apparent when for a better understanding of the invention, reference is made to the following description taken in conjunction with the accompanying drawings which show a preferred embodiment thereof and in which:

FIGURES 3 and 4 are similar to FIGURES 1 and 2 respectively with certain parts removed or shown in section for clarity;

Figure 20:
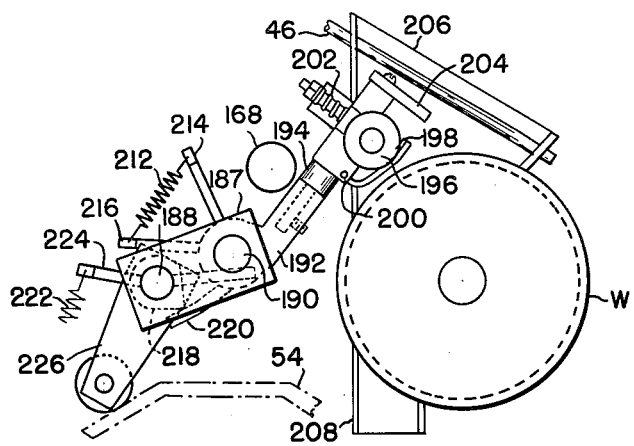
Figure 21:
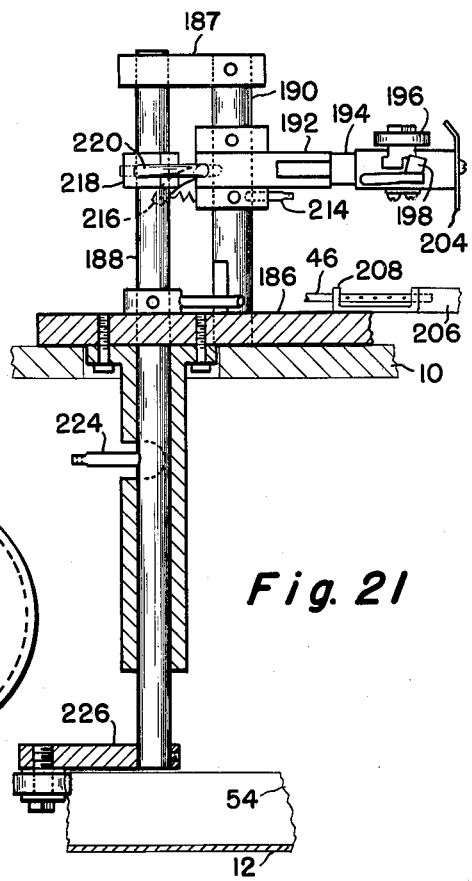
Figure 22:
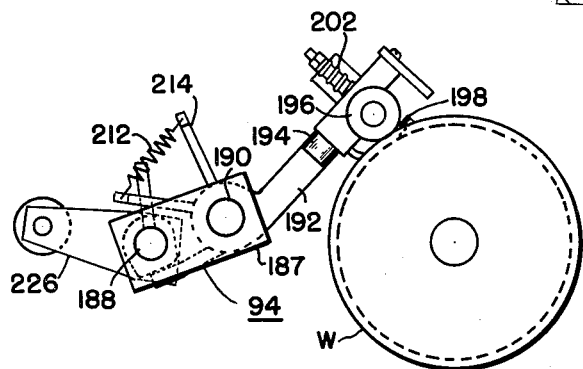

FIGURES 8, 9, 10, and 11 are views of the handle holder fixture which they respectively show in top plan, side elevation, and front elevation with the dies closed and also in front elevation with the dies open;

FIGURE 12 is a face view of an open die of FIGURE 11;

FIGURES 13 and 14 are sections taken along the section lines XIII—XIII, XIV—XIV of FIGURE 8;

FIGURES 15 and 16 are top plan and longitudinal sectional elevational views of the cup supporting fixture;

FIGURE 17 corresponds to FIGURE 16 but shows a cup clamped in place on the fixture;

FIGURES 18 and 19 are transverse sectional views taken along the lines XVIII—XVIII, XIX—XIX of FIGURE 16;

FIGURES 20 and 21 show the cutter fixture respectively in top plan and longitudinal sectional elevation views; and FIGURE 22 corresponds to FIGURE 20 but shows the cutter in the cutting position.

In FIGURES 1–4, I show a preferred embodiment of my machine adapted to carry a relatively rotatable turntable 10 and a fixed platform 12 which are of circular shape and which are mounted thereon in vertically spaced relationship to one another. A generally upright frame 14 directly supports the platform 12 and has a series of side braces 16 which run diagonally between the base of the frame and the rim of the fixed platform 12. The turntable 10 forms a traveling carrier for ten spaced sets S of fixtures which are mounted to revolve therewith at the periphery and which in brief transfer ware W consisting of green cup bodies from a loading station A through a clamping station B to a cutting station C for trimming the lip of the cup, the table rotation being counterclockwise as indicated by the arrow 18. A station D sponges the passing cups and at E the preformed green handles P are loaded into the fixtures S. The preformed handles P are affixed to the cup bodies at station F and the completed cup still in the semi-plastic or green state is unclamped at G for unloading at the station H. At this station the finished ware W with the handles affixed thereto is ready for drying and firing.

The rim of the turntable 10 runs on a set of four rollers 20 which have fixed axles and which are supported on the platform 12 by means of adjustable supports 22 of the slide rod and set screw type. A vertical drive shaft 24 forms a supporting spindle for the table 10 which is keyed to the latter at 26 and which has its midportion and base mounted to turn respectively in a pilot bearing 28 and in a thrust bearing 30 which are secure in the frame 14. An electric drive motor 32 is connected through a gear speed reducer 34 and a pair of meshing bevel gears 36 to drive the vertical shaft 24. A hub-shaped air manifold 38 at the center of the turntable 10 forms a sealed rotary joint with a center-fed fitting 40 which is stationarily carried by an air supply pipe 42 affixed at its upper end (not shown) to an overhead support. The fitting 40 has one radially extending port which in succession registers with ten ports 44 in the manifold 38, each supplying a radially extending air pipe 46 to blow scavenging air in the direction of the rim of the table to dispose of clay chips.

The fixed platform 12 carries a set of five arcuate cam rails 50, 51, 52, 53, and 54 mounted to its upper surface at different radial distances from the drive shaft 24 (FIGURE 4). The cam rails 50, 51, and 53 respectively, engage three vertically displaceable lift members which operate various ones of the sets S of fixtures in a manner more fully described hereinafter. The cam rails 52 and 54 operate two laterally displaceable operating members in the sets S.

A drive belt 57 disposed adjacent the turning and sponging stations C and D (FIGURE 3) is trained on fixed axis sheaves 58 such that the inner flight thereof runs counterclockwise as an encroaching chord on the arc of revolution of the table 10 and assists in the turning and sponging operations hereinafter described. A bumper wheel 60 with its axle fixed to the platform 12 is disposed adjacent the unclamping station G (FIGURE 3) to rotate the cup through a fractional part of a revolution generally after the manner of the drive belt 57 which serves to rotate the cup through multiple revolutions.

Figure 5:
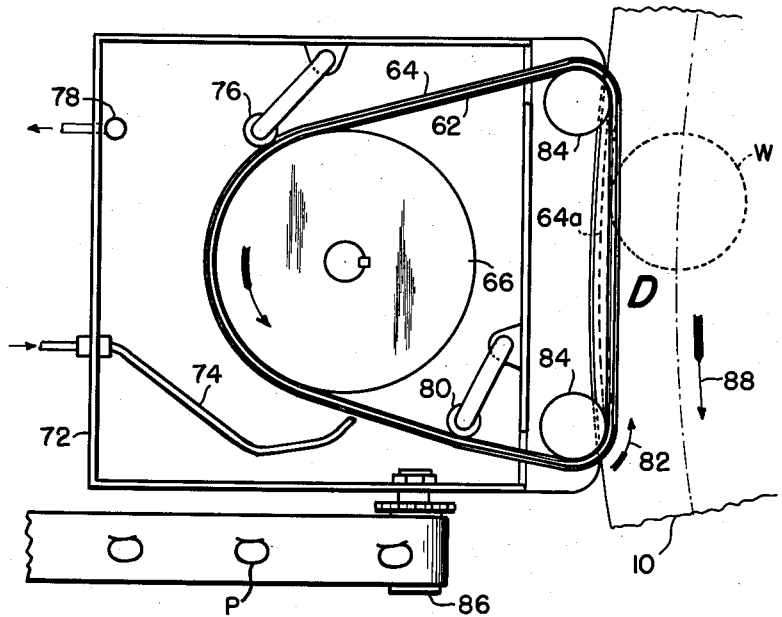
FIGURES 5 and 6 are plan and elevational views of the sponge belting drive of FIGURE 1.
Figure 6:
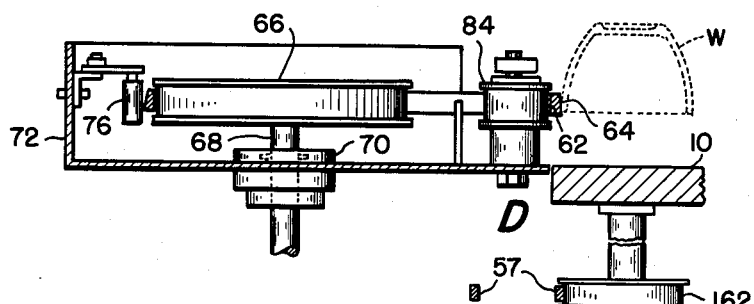

The sponge belt assembly for the sponging operation at station D is more particularly shown in FIGURES 5 and 6. The sponge belting consists of a strong webbed backing 62 which is faced at 64 with a thick cushion of sponge rubber and which together therewith forms an endless belt driven by a drive pulley 66. The sponge facing 64 is thicker at the lower edge than at the upper edge as seen in FIGURE 6 and thereby has a nonsymmetrical cross-section so that it can reach slightly beneath and smooth the lip of the body of the green cup ware W at a bevel angle. The pulley 66 is fast to the upper end of a vertical spindle 68 that passes through a water seal 70 in the bottom of a water pan 72.

Water is continually sprayed on the sponge facing 64 through a water pipe 74 passing through the end wall of the pan 72. An idler roller 76 rides on the sponge facing 64 of the belt and rids it by slight pressure, from its excess water adjacent a water outlet 78 in the pan 72. Another idler 80 rides on the backing 62 of the endless belt to keep proper tension thereon and the tensioned belt travels in the direction of the arrow 82, being trained over a pair of guide pulleys 84 having fixed vertical axes. These pulleys are fixed on two axles in the bottom of the pan 72 and, in the side wall thereof, a flat pulley 86 is journaled on a fixed axis to support a flat belt conveyor carrying the preformed handles P.

The flight of the sponge belting between the guide pulleys 84 is trained to encroach chordally on the arc of revolution of the table and is horizontally aligned with the lip of the cup ware W, this engagement causing the flight of belting to move to a displaced position 64a shown by dotted lines wherein it wraps against the lip and extends slightly thereunder. Due to the large diameter of the drive pulley 66 when running at moderate speeds the sponge belting circulates rather rapidly in the counterclockwise direction of the arrow 82 whereas the cup ware W rotating clockwise in the direction of arrows shown spins at a relatively slower speed such that the sponge belting slides along the lip of the cup ware as the cup ware revolves by on the arc of revolution indicated by the arrow 88. Compared to the endless drive belt 57 (FIGURE 3) which rotates the cup ware W, the period of engagement of the sponge belt is considerably shorter at both ends of its operation although the two operations necessarily overlap.

Figure 7:
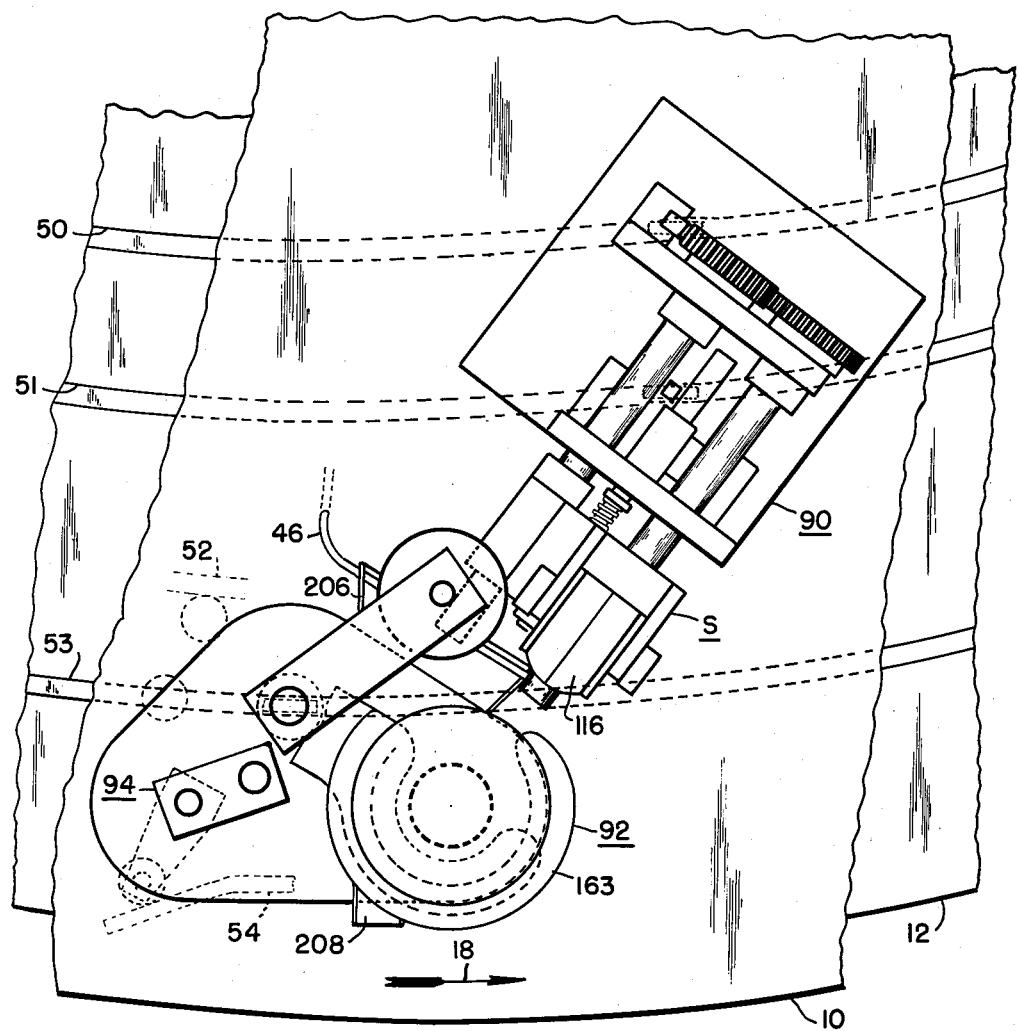
FIGURE 7 is a plan view of one of the sets of fixtures on the table in FIGURE 1.

In FIGURE 7, I show one complete set S of the ten fixture assemblies on the table 10. A handle holder fixture indicated at 90 is operated automatically by means of the two lift cam rails 50 and 51 mounted to the fixed platform 12. A cup supporting fixture is generally indicated at 92 and is automatically operated by means of the lift cam rail 53, and by means of the companion cam 52 which laterally displaces one of the operating members for the cup supporting fixture 92. A cutter fixture 94 operated by the cam rail 54 is used for the turning operation on the cup ware to trim the lip thereof.

More specifically, the handle holder fixture 90 on the table 10 is shown in detail in FIGURES 8–14 and consists of a radially disposed supporting frame 96 having inner and outer supporting plates 98 and 100 which carry a pair of longitudinally extending parallel guide rods 102 and 104. The outer ends of the guide rods carry a handle holder slide 106 having a bearing opening at one side that rides directly on the rod 104 and carrying a separate sleeve 108 at the opposite side which turns within the slide but slides therewith on the rod 102 passing through the sleeve 108. A key and keyway connection 110 between the rod 102 and the sleeve 108 causes the sleeve to take the angular attitude set by the rod in all positions of the sleeve therealong.

A pair of fixed and movable die chuck jaws 112 and 114 is arranged on the slide 106 with the jaw 112 in a permanently vertical position and with the die chuck jaw 114 fast to the sleeve 108 that turns with the rod 102. Each chuck jaw 112, 114, carries one of a pair of dies 116 which when moved together form a handle chuck to receive the preformed handles P. Each die 116 is carried in a trunnion mounting 118 in the adjacent die chuck jaw. Dowels and complementary dowel openings in the faces of the dies 116 hold them in alignment for joint pivotal movement on the trunnion mountings 118 after the rotatable chuck jaw 114 is brought into clamped position with the fixed jaw 112. FIGURE 12 shows a face view of one of the dies 116 to illustrate the complementary mating recesses provided therein.

The lift cam rail 50 (FIGURE 9) rotates the jaw 114 between its horizontal loading position of FIGURE 11 and its closed position shown in FIGURE 10. For this purpose a cam follower 120 carries a roller at the lower end that rides on the cam rail 50, being biased thereagainst by means of a hold-down spring 122. The cam follower 120 is vertically slidable in the support plate 96 and carries a vertically moving rack 124 at the head thereof which through a pair of pinions 126 and 128, rocks the guide rod 102 which is fast to the pinion 128 and is journaled for rotation in the spaced plates 98 and 100. The guide rod 104 is fixed in these plates, forming a fixed axle for the motion reversing idler pinion 126 which turns thereon and meshes at one side with the rack 124 and at the opposite side the pinion 128. The spring 122 normally biases the chuck jaw 114 to the horizontal loading position of FIGURE 11.

A third rod 130 which is parallel to the two guide rods 102, 104 has a slide joint connection (FIGURE 14) with the midportion of the slide 106 being operative to retract it to its reset position by means of a nut 132 and having a lost motion spring 134 carried thereby in a manner to bias the slide 106 forwardly when the third rod 130 is advanced. A cam follower 136 rides on the cam rail 51 (not shown) and is connected by means of a vertically acting rack 138 and a horizontally acting rack 140 integral with the rod 130 to advance that rod and to retract it at the proper time so as to reset the slide 106. A rack pinion 142 (FIGURES 8, 13 and 14) having a fixed axle and double width teeth continually meshes with the two racks 138 and 140 so as to translate the vertical motion of the follower 136 into horizontal motion controlling the slide 106. A follower return spring 144 biases the slide into its reset position and thus forces the cam follower 136 to firmly ride on the lift cam rail 51 (not shown).

The handle holder is operated from an initial loading position indicated by FIGURE 11 wherein the jaw 114 first receives a handle P while it rests against an adjusting stop 146 and while the slide is fully retracted. The lift cam 50 first acts through its rack and pinion connection to rotate the rotatable jaw 114 to the position of FIGURES 9 and 10 and thereupon the lift cam 51 (not shown) operates through the rack and pinion connection of FIGURE 13 to advance the handle holder forwardly into the dotted line position shown by the dotted lines 116a in FIGURE 9. It is noted that the slide 106 is brought in at an oblique angle to the surface of the cup ware body W and as viewed in FIGURE 9, the upper edge of the preformed handle P is the leading edge to engage the cup ware body W as the spring 134 thereafter starts to yield. Continued advance of the slide 106 at a slower rate causes the dies 116 to pivot conjointly on their trunnion mountings 118 to undergo a slight transverse motion such that the preformed handle P rubs as it wipes and seats into place against the ware W. A pair of return springs one of which is indicated at 148 and each of which is connected to a different die trunnion 118, elastically yields in tension to enable the dies to pivot properly and thereafter exerts a continuous bias to move them to their unpivoted positions. The rotatable jaw 114 is then released due to the action of the cam 50 (not shown) and the two dies 116 unclamp the handle which stays firmly adhered to the body of the cup ware W. Subsequently, the lift cam rail 51 (not shown) resets the slide 106 to its retracted position shown in solid lines in FIGURE 9 so as to prepare the dies for reloading with another preformed handle P.

The present handle holder fixture 90 provides extreme accuracy and firmness in sticking the handles. The fixed axes of the guide rods 102, 104 and the trunnion mountings 118 insure that the handle is at all times in the longitudinal plane of the ware W. The springs 148 insure that one edge of the handle constitutes a leading edge so that the handle will cam itself and then slide against the cup surface to even out and make uniform the line of contact therewith. The spring 134 insures that the contact is solid and made under the proper pressure which it uniformly produces as the third slide rod 130 overtravels and collapses that spring by the necessary amount.

The cup supporting structure 92 is more completely shown in FIGURES 15–19 and includes a support chalk 150 consisting simply of a turned chalk block having the desired inside contour of the finished ware W which is eventually to be produced. A cover plate 152 mounted in an opening in the turntable 10 carries a spindle 154 which is journaled for turning and sliding movement therein on a vertical axis and which is fast at its upper end to a supporting hub 156 on the support chalk 150. The hub 156 has a floating mounting consisting of a thrust bearing 158 and a coaxial coil spring 160 that acts in compression to yieldably support the chalk support 150. A drive pulley 162 fast to the lower end of the drive spindle 154 has a groove in which the drive belt 57 rides. The flight of the drive belt 57 that fits in the groove engages the opposed sides thereof so as to be deflected therewith in a vertical plane as the spindle moves up and down on its floating mounting. During this engagement the belt 57 is also deflected laterally by the pulley 162 so as to wrap itself arcuately for a few degrees along this pulley.

In its uppermost position as shown in FIGURE 16, the spindle 154 carries the support chalk 150 at a point at which the lip of the cup ware W will engage an arcuate shaped locator plate 163 (FIGURES 7 and 16) so as to locate the ware square to the support chalk 150. At a confronting location immediately above the bottom of the inverted ware W, a circular hold-down plate 164 is provided and the two plates 163 and 164 have a common carrier post 166 so as to move them vertically in unison. The carrier post 166 has an inner rod section 168 which is mounted to slide with the post but turns relative thereto on a vertical axis and which carries a pair of laterally protruding, apertured plates 170 in which a spindle 172 with adjustable stops thereon is mounted so as to rotate and to carry therewith the hold-down plate 164. The weight of the post 166 is augmented a predetermined amount by means of a gravity weight 173 between the plates 170 so as to press the hold-down plate 164 under load to a point of predetermined level at which it always seeks a balanced position with the spring 160. This level is adjusted by selection of weight 173 and thereafter stays the same regardless of the accuracy of fit between the support chalk 150 and the inner surface of the cup ware W, depending solely on the adjusted load of the post compared to the strength of the spring 160.

The inner section 168 of the carrier post 166 is biased by means of a spring (not shown) so as to rotate the two plates 170 and the hold-down plate 164 into the solid line position of FIGURE 15. The hold-down plate 164 is capable of pivoting into this position due to the turning of the inner section 168 of the post within an outer sleeve section 174 thereof which is fast to the locator plate 163 and is keyed at 176 to the plate 152 to prevent turning. A circumferentially extending slot 177 in the sleeve section 174 (FIGURE 19) enables the inner section 168 to turn carrying with it a cam follower 178 having a roller that runs on the cam rail 52 (FIGURE 15). While engaged therewith, the cam rail 52 holds the cam follower 178 at one end of the slot 177 in the position according to the solid lines in FIGURE 19, but toward one end thereof the cam rail 52 has an inwardly extending exit flank 52' which the cam follower 178 follows inwardly under the bias of a spring (not shown) acting on the post section 168. In this fashion the hold-down plate 164 is pivoted into the solid line position of FIGURE 15 where it is limited in its rotation by means of a pin 180 which rotates with a collar 182 fast to the inner section 168 to a point at which it engages a fixed stop 184 (FIGURE 18). Conversely, the hold-down plate 164 is pivoted into the dotted line loading position shown by the dotted lines 164a in FIGURE 15 due to an entrance ramp 52'' (FIGURE 3) on the cam rail 52 which deflects the cam follower 178 upon initial engagement to bring it into the dotted line position 178a of FIGURE 15.

This latter action which resets the hold-down plate occurs with but slightly after the cam rail 53 (FIGURES 3 and 16) initially lifts the hold-down plate 164 and then the table rotates approximately two-thirds of a revolution with the hold-down plate 164 in this reset position. The hold-down plate 164 is automatically lowered by the lift cam rail 53 at a time slightly past the point at which the follower 178 has run off of the cam flank 52' (FIGURES 3 and 16) enabling the plate to pivot into its position in which the spindles 154 and 172 (FIGURE 16) are exactly vertically aligned.

The cutter fixture 94 for turning the lip of the ware W is more particularly shown in FIGURES 20 through 22. A cover plate 186 mounted across an opening in the table 10 carries a pair of closely spaced vertical rods having a common spacer plate 187 at their upper end and one of which, indicated at 188, is rotatable whereas the other forms a fixed post 190. A swinging cutter arm 192 has a fixed end which encircles the rod 190 and the arm 192 carries a cutter holder 194 at the swinging end thereof. The cutter holder 194 carries a gauge wheel 196 which is mounted on a fixed vertical axle thereon and which runs on the outer periphery of the ware W being turned in a plane slightly above the lip of the ware. A cutter knife 198 disposed below the gauge wheel 196 is pivotally mounted at 200 to swing relative to the holder 194 and a spring 202 biases the cutter knife 198 in the direction of the ware W. The holder carries a fixed guard 204 at the outer end thereof.

A shallow waste collecting tray 206 is mounted to the cover plate 186 at a point below the cutter knife 198 and has a wide inner end across which the end length of one of the scavenging air pipes 46 (FIGURES 4 and 20) is disposed. Each pipe 46 is plugged at the end and perforated along one side with a series of equidistantly spaced holes (FIGURE 21) to blow over the entire area of the tray. The walls of that tray 206 converge in a radially outwardly direction so as to define a narrow throated chute 208 which at one point in the rotation of the turntable will register with a waste collecting chute shown at 210 in FIGURE 3.

The swinging arm 192 is pivoted into the operating position for cutting by means of a tension spring 212 of which one end is anchored to a fixed anchor 214 and the opposite end pulls on a finger 216 which is rigidly secured to the hub of the arm 192. In that cutting position as shown in FIGURE 22 the spring 212 holds the gauge wheel 196 solidly against the ware W and the spring 202 lightly biases the cutting knife 198 against the lip of the war W to trim sharp edges from it. A cutter retracting cam 218 has a nose portion thereon engaging a cam follower finger 220 affixed to the hub of the arm 192.

A tension spring 222 acts on a finger 224 fixed to the rotatable rod 188 to bias the cutter retracting cam 218 into the operative position with its nose engaging the cam follower 220 on the arm 192. However, another cam follower 226 makes it possible for the nose of the cam 218 to be automatically rotated to an inoperative position no longer blocking the cam follower 220, the first mentioned cam follower 226 being fast to the lower end of the rod 188 and carrying a roller that runs on the short cam rail 54 on the platform 12. Thus in FIGURE 20 when the ramp of the cam 54 engages the roller on the follower 226 it moves the retracting cam to inoperative position whereupon the cutting knife 198 assumes the solid line position of FIGURE 22 and the cutter blade does not retract until the follower 226 runs off the cam 54 at the flank on its opposite end.

Figure 1:
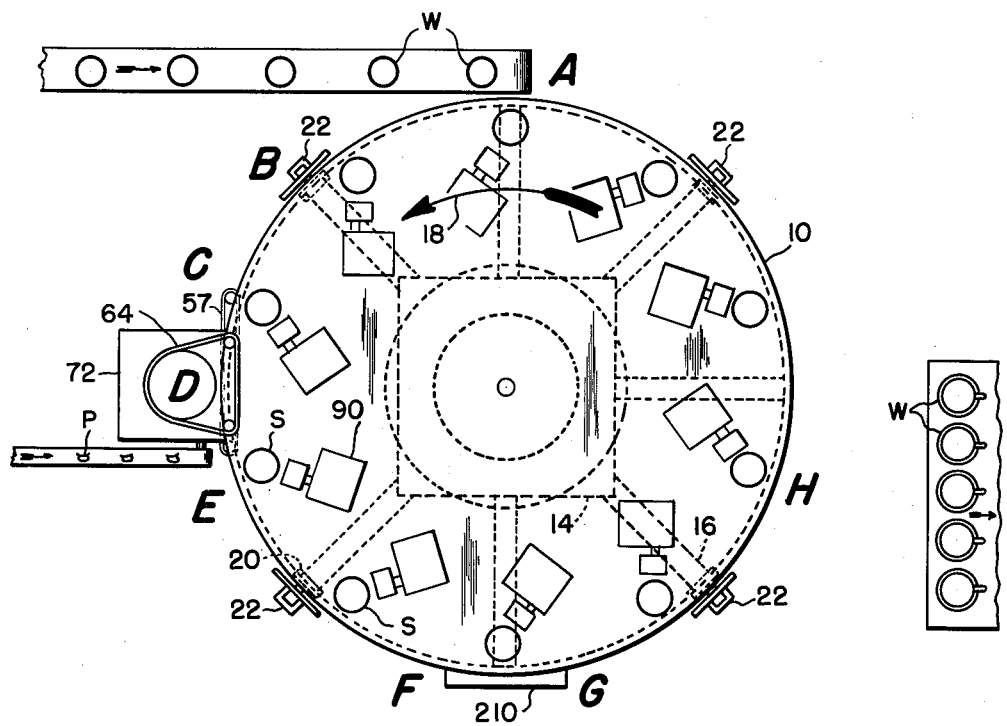
FIGURES 1 and 2 are top plan and front elevational views of my handle sticking machine.
Figure 2:
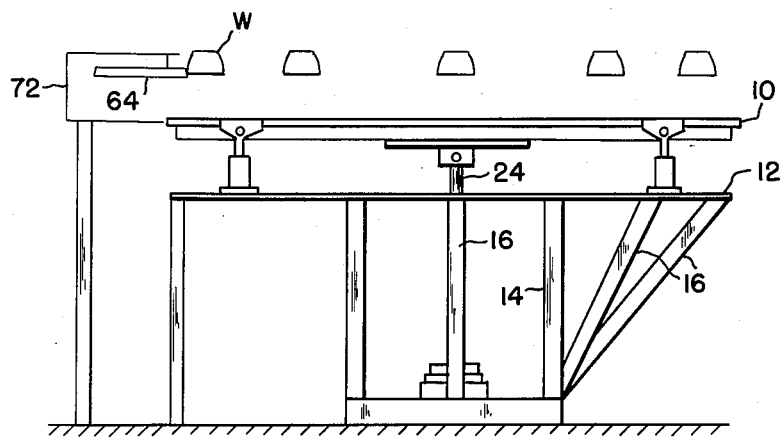

In the operation of my handle sticking machine of the preceding FIGURES 1–22, an operator at the loading station A of FIGURE 1 transfers cup ware by hand from a conveyor belt and places the ware W in an inverted position on the support chalks 150 of FIGURES 16 and 17. The flank 52' of the cam 52 of FIGURE 15 then automatically pivots the hold-down plate 164 to its coaxial position with the drive spindle for the cup support 150 and thereafter the carrier post 166 lowers the hold-down plate so as to clamp the ware W and simultaneously lowers the locator plate 163 out of the way. This occurrence is at station B of FIGURE 3 and at the cutter station C on that figure, the belt 57 engages and the turning operation starts. Shortly thereafter at station D the belt 64 engages so that the sponging operation occurs and then both belts disengage whereupon friction substantially simultaneously stops the support chalk spindle 154 from turning. At the handle loading station E the handle holder of FIGURES 8–14 is loaded by hand, the operator first dipping one edge of the preformed handles P in an adhesive slip of liquid clay and depositing the same in the horizontal one of the dies 116 (FIGURES 11 and 12).

In the vicinity of station F the dies 116 close, slide forward with the slide 106, pivot the handle so as to rub it into position against the non-rotating ware body W according to FIGURE 9, and thereafter they automatically reopen leaving the preformed handle P still occupying the mating recess of the vertically disposed die 116 of FIGURE 11.

At station G in a rapid succession of steps, the cup holddown plate 164 is lifted by the cam rail 53 and then pivoted to its reset or loading position. The pulley 162 drags against the bumper 60 (FIGURES 3 and 16) fixed in its path to turn the cup ware W through a fractional part of a revolution so as to rotate its attached handle P forwardly from the vertical die 116 of FIGURE 11 to give it proper clearance therefrom. In closely following order the cam follower 136 of FIGURE 9 rides down the flank of the lift cam 51 so as to reset the slide 106 with the dies 116 clear of the cup handle and ready for reloading with a fresh preformed handle. With the hold-down plate 164 reset and with the dies 116 reset and the cutter knife 198 in the inoperative position of FIGURE 20, the fixtures S revolve idly with the turntable 10 through approximately one-half of a table revolution enabling the unloading operator at station H to simply grip the top of the handled ware W in her fingertips and remove and relocate it on other support chalks on an adjacent conveyor for further processing. Between unloading and the start of more handling, ample time is provided for a loading operator at station A to load the passing support chalks 150 insuring that each one is provided with a body of green cup ware W to be turned, sponged and handled.

It is noted that the drive belt 57 of FIGURE 1 and the endless belt thereabove having the sponge facing 64 are power driven by power means (not shown) so as to run continuously and it is further noted that the cams 50, 51, 52, 53 and 54 provide for automatic operation of the turntable 10 as it is continuously rotated by the drive shaft 24 of FIGURE 4. The effective rate of output of his automatic machine therefore depends solely on a convenient running rate for the two loading operators at the stations A and E of FIGURE 1 and the unloading operator at station H. With this machine a very satisfactory rate has been established with an output of approximately 110 dozen cups per hour, but this particular output is given purely by way of example and it can be varied faster or slower depending on the experience and effectiveness of the operators themselves.

I have shown a preferred embodiment of my invention but it is to be understood that it may be otherwise embodied within the scope of the following claims.

I claim:

1. Mechanism in a cup turning machine to cooperate with a cutting knife to turn cups comprising in combination, a traveling carrier, a rotatable cup support adapted to travel therewith, a spindle fast to the cup support for supporting same and mounted to turn and slide vertically therewith in said carrier, a hold-down plate having a supporting post supporting the same above the cup support, said supporting post being mounted for limited movement on a fixed vertical axis on said carrier, a spring acting on said spindle to bias the cup support upwardly, and load means operatively connected to and augmenting the weight of the supporting post to a predetermined value so that when it drops downwardly to depress the cup holddown plate into engaged position, the load of the post deflects the spring by a uniform amount and moves into the same predetermined balanced position therewith irrespective of variations in fit between the cup and the cup support.

2. Mechanism in a cup turning machine for cooperating with a cutting knife to turn cups, comprising in combination, a traveling carrier, a rotatable cup support adapted to travel therewith, a supporting spindle fast to the cup support for supporting same and mounted to turn and slide vertically therewith in said carrier, a cup locator plate and a hold-down plate having a common supporting post supporting the same below and above the cup support respectively, said supporting post having relatively rotatable sections connected to different ones of said plates and mounted for limited movement together on a fixed vertical axis on said carrier, a spring acting on said spindle to bias the cup support upwardly, and load means operatively connected to and augmenting the weight of the supporting post to a predetermined value so that when it drops downwardly to depress the cup locator plate and bring the cup hold-down plate into engaged position, the load of the post deflects the spring by a uniform amount and moves into the same predetermined balanced position therewith irrespective of variations in fit between the cup and the cup support.

3. Mechanism in a cup turning machine to cooperate with a cutting knife to turn cups comprising in combination, a traveling carrier, a rotatable cup support adapted to travel therewith, a spindle fast to the cup support for supporting same and mounted to turn and slide vertically therewith on said carrier, a cup locator plate and a hold-down plate having a common carrier post supporting the same above and below the cup support respectively, said supporting post having relatively rotatable sections connected to different ones of said plates and mounted for limited movement together on a fixed vertical axis on said carrier, a spring surrounding the spindle and supported at its lower end by the carrier, a thrust bearing acting between the upper end of the spring and the cup support to provide a floating mounting on which the support freely revolves, and a gravity weight on said post increasing the load thereof to a predetermined point so that when it drops downwardly to depress the cup locator and bring the cup hold-down plate into engagement, the load will deflect the spring by a uniform amount and move the post into a balanced position therewith at the same point irrespective of variations in fit between the cup and cup support.

4. In a cup turning machine, the combination comprising a support, a carrier mounted to travel thereon, and rotatable cup support, locator plate and hold-down plate members shiftably mounted in vertically spaced disposition on said carrier, said hold-down plate member having the more elevated disposition to provide clearance for a cup inserted between it and the cup support member for a turning operation and connected for conjoint vertical movement with said locator plate member whereby they engage each cup on said cup support member in alternation to one another, said carrier carrying an actuated member engageable with means on said support to independently pivot said hold-down plate member in its elevated disposition to an overlying position in registry with said cup support and locator plate members, another actuated member carried by said carrier engageable with means on said support to conjointly depress said locator plate member into a relatively removed position and said hold-down plate member toward said support member into a hold-down position, there being subsequently actuating means on said support to effect return movement of said locator plate member and of said hold-down plate member automatically to its elevated unpivoted position.

5. Mechanism in a cup turning apparatus for cooperating with the cutting knife to turn the cups comprising, in combination, a rotatable cup support and hold-down plate shiftably mounted thereon with their disposition being such as to be on different levels on said carrier and with said hold-down plate being at a first level, means comprising yieldable means on said carrier and shiftably supporting said cup support thereon at a second level below said first level and biasing said cup support in the direction of the hold-down plate, and hold-down plate mounting means on said carrier shiftably mounting said hold-down plate to pivot in the horizontal plane of said first level from an unactivated position to a vertically aligned confronting position with respect to said cup support for receiving a cup therebetween, and operable to load and downwardly move said hold-down plate relative to said support, whereby under relative movement the hold-down plate clamps the cup to the cup support under load so as to depress the support to a third limiting level at which the weight of the load, the cup, and the support establish a point of balance against the opposing bias of the yieldable means.

6. Mechanism in a cup turning apparatus for holding cups to be turned thereon comprising, in combination, a traveling carrier supported on said apparatus, a pair of adjacent vertical supporting posts on said carrier each mounted to pivot and slide independently of one another, the upper end of one of said posts extending beyond the corresponding end of the other post, a hold-down plate secured to the upper end of said one post in a laterally offset position, rotation causing and release causing means supported by said carrier and operatively connected with said one post to pivot the hold-down plate to a point above the other post and to release the hold-down plate for sliding towards said other post, to trap a cup therebetween, said first named means responsive to rotation of said carrier with respect to said apparatus and comprising torque transferring mechanism connected to said plate for pivoting same and a linear motion mechanism supportingly connected to said plate for releasing same for vertical linear motion, and second means comprising said other post and a yieldable support means on said carrier and effective for yieldably supporting the trapped cup so as to cooperate with the hold-down plate in effecting a pressure clamping action on the cup.

7. Mechanism according to claim 6 wherein said first named means is constituted by release causing means as aforesaid, and wherein said release causing means comprises a releasing cam operatively carried by said apparatus, and a cam follower and a gravity weight operatively carried by said one post on the carrier and arranged with a cam disposed in said apparatus in aligned contact with the cam follower enabling said apparatus to support the cam, cam follower, one post, and gravity weight so long as, and only so long as, the cam remains in alignment with the cam follower.

References Cited in the file of this patent
UNITED STATES PATENTS

| | | |
|---|---|---|
| 917,627 | Lizotte | Apr. 6, 1909 |
| 1,243,969 | Park | Oct. 23, 1917 |
| 1,572,631 | Whitmore et al. | Feb. 9, 1926 |
| 1,759,058 | Miller | May 20, 1930 |
| 1,989,517 | Holmes | Jan. 29, 1935 |
| 2,331,876 | Walpole | Oct. 19, 1943 |
| 2,374,339 | Emerson | Apr. 24, 1945 |
| 2,374,555 | Miller | Apr. 24, 1945 |
| 2,374,769 | Musante | May 1, 1945 |
| 2,413,540 | Bloore | Dec. 31, 1946 |
| 2,418,763 | Eisler | Apr. 8, 1947 |
| 2,425,928 | Emerson | Aug. 19, 1947 |
| 2,507,998 | Russell | May 16, 1950 |
| 2,537,922 | Strasser | Jan. 9, 1951 |
| 2,553,534 | Palermo | May 15, 1951 |
| 2,560,007 | Steele | July 10, 1951 |
| 2,619,701 | Jordan | Dec. 2, 1952 |
| 2,632,223 | Jordan | Mar. 24, 1953 |
| 2,729,870 | Guthrie | Jan. 10, 1956 |
| 2,734,247 | Ryckman | Feb. 14, 1956 |
| 2,763,972 | White | Sept. 25, 1956 |
| 2,819,490 | Froot | Jan. 14, 1958 |
| 2,848,843 | Schoenoff et al. | Aug. 26, 1958 |